United States Patent [19]

Fennessy, Sr.

[11] Patent Number: 5,271,690

[45] Date of Patent: Dec. 21, 1993

[54] METHOD AND APPARATUS FOR FORMING WALKWAYS HAVING DETECTABLE WARNING SURFACES

[75] Inventor: Paul M. Fennessy, Sr., Liverpool, N.Y.

[73] Assignee: Stampcrete International Ltd., Grand Cayman, Cayman Islands

[21] Appl. No.: 835,305

[22] Filed: Feb. 14, 1992

[51] Int. Cl.⁵ .................. B29C 59/02; E01F 9/00; G09B 21/00
[52] U.S. Cl. .................................. 404/9; 425/385
[58] Field of Search .............. 404/9, 15, 19, 94, 93; 425/385

[56] References Cited

U.S. PATENT DOCUMENTS

| | | | |
|---|---|---|---|
| 4,131,406 | 12/1928 | Fresquez | 425/385 |
| 4,620,816 | 11/1986 | Kupfer | 404/9 X |
| 4,715,743 | 12/1987 | Schmanski | 404/15 X |
| 4,993,867 | 2/1991 | Usow | 404/93 X |
| 5,061,172 | 10/1991 | Fennessy, Sr. | 425/385 |

*Primary Examiner*—William P. Neuder
*Attorney, Agent, or Firm*—Shlesinger, Arkwright & Garvey

[57] ABSTRACT

The present invention provides a method for forming a concrete surface having visual and tactile warning means for pedestrian traffic as well as for the users of wheeled conveyances produced by pouring a prepared concrete mixture into a concrete receiving form, floating the surface of the poured concrete, partially setting the concrete until a plastic state is achieved, covering the surface of the concrete with a release agent of a color different from the color of the concrete. Next, a stamp member is provided having a generally planar stamp surface interrupted by a pattern of indentations formed in the generally planar stamp surface. Additional colored release agent is applied to the stamp member and the stamp member is then positioned onto the concrete surface so that the release agent on the generally planar stamp surface contacts the release agent on the concrete surface. Pressure is then applied to the stamp member forcing concrete to flow into and fill the indentations, simultaneously causing intimate mixing of the colored release agent with the concrete flowing into the indentations. The stamp member is removed yielding a generally planar concrete surface superficially covered with color release agent and a pattern of projections of a shape corresponding to the shape of the indentations of the stamp member and being comprised of an intimate mixture of concrete and colored release agent. The concrete is set until hardened and subsequently rinsed, whereby the superficial colored release agent is removed from the generally planar surface leaving the projections colored with the release agent and contrasting with the generally planar surface from which the release agent was removed.

33 Claims, 2 Drawing Sheets

METHOD AND APPARATUS FOR FORMING WALKWAYS HAVING DETECTABLE WARNING SURFACES

FIELD OF THE INVENTION

This invention relates to a method for forming concrete surfaces having combinations of visual and tactile warning means alerting pedestrian and user's of wheeled conveyances to the potentially dangerous conditions associated therewith. More particularly, this invention provides a method for forming concrete ramps and similar structures having visual and tactile warning means alerting pedestrians, wheelchair users, bikers and the like of the potential dangers associated with such ramps.

BACKGROUND OF THE INVENTION

Federal Regulations effective in 1992 require curb ramps to be provided with detectable warning in the form of raised truncated domes with a nominal diameter of 0.9 inches or 23 millimeters, a nominal height of 0.2 inches or 5 millimeters and a nominal center-to-center spacing of 2.35 inches or 60 millimeters. The truncated domes are required to visually contrast with the adjoining surface by assuming light-on-dark or dark-on-light contrast patterns. Furthermore, the material used in producing the contrast is required to be an integral part of the structure's surface.

The purpose of such ramp constructions is to alert users to their presence by providing tactile as well as visual indications or warnings. The presence of truncated domes provides a tactile warning detectable by foot contact, contact by wheels including wheelchair wheels and bicycle wheels and by contact with walking aids such as canes. The tactile warning is particularly functional in alerting the visually impaired or blind to the presence of ramps.

Furthermore, the contrasting visual pattern provided between the truncated domes and the surrounding ramp surface is particularly suited for alerting those users who are not visually handicapped as to the presence of such ramps. This contrasting visual scheme is readily discernible to oncoming traffic, be it foot traffic or more rapidly approaching vehicular traffic, such as bicycle traffic.

SUMMARY AND OBJECTS OF THE INVENTION

The present invention sets forth a method for forming concrete surfaces with integral visual and tactile warning means. The concrete surfaces with integral warning means as envisioned herein encompass not only ramps but other concrete surfaces including, but not limited to, sidewalks and roadways. The combined visual and tactile warnings are incorporated into various concrete surfaces in order to alert users to potential hazardous conditions such as the present of ramps, curves, grades, obstruction, crosswalks, intersections and the like.

In general, a concrete surface is formed according to the present invention by first preparing a concrete mixture and by pouring the concrete mixture into a concrete receiving form. The surface of the poured concrete is floated and the concrete is allowed to stand until achieving a partially set plastic state. A release agent of a color different from the color of the concrete is then applied to the concrete covering the surface thereof. A stamp member, having a generally planar surface interrupted by a pattern of indentations, is likewise coated with colored release agent and positioned on the surface of the concrete. Pressure is applied to the reverse side of the stamp member forcing concrete to flow into the indentations, simultaneously mixing the colored release agent and concrete with the areas of the indentations filling the indentations with concrete which is now intimately mixed with colored release agent.

The stamp member is removed yielding a generally planar concrete surface superficially covered with colored release agent interrupted by a pattern of projections extending therefrom. The projections are of a shape corresponding to the shape of the indentations and are formed from an intimate mixture of concrete and colored release agent.

After hardening, the entire concrete surface is rinsed, whereby the superficial colored release agent is removed from the generally planar surface leaving the projections colored with colored release agent and contrasting with the generally planar surface from which the release agent was removed.

It is therefore an object of the present invention to provide a method for forming various concrete surfaces with combined visual and tactile warning means.

It is another object of the present invention to provide a method for forming curb ramps having warning means complying with newly established Federal Regulations.

It is a further object of the present invention to provide a method for forming concrete surfaces with warning means in the form of projections which are visually discernable by being of a color contrasting with the color of the non-projecting areas and which are discernable through foot contact, contact with wheels and contact with walking aids.

It is still another object of the present invention to provide a method for forming concrete surfaces such as sidewalks and roadways with integral visual and tactile warning means alerting users to hazardous conditions including curves, grades, obstructions, crosswalks and intersections.

These and other objects and advantages of the present invention will appear from the following detailed description, taken in connection with the accompanying drawings, in which.

DETAILED DESCRIPTION OF THE INVENTION

Figure 1:
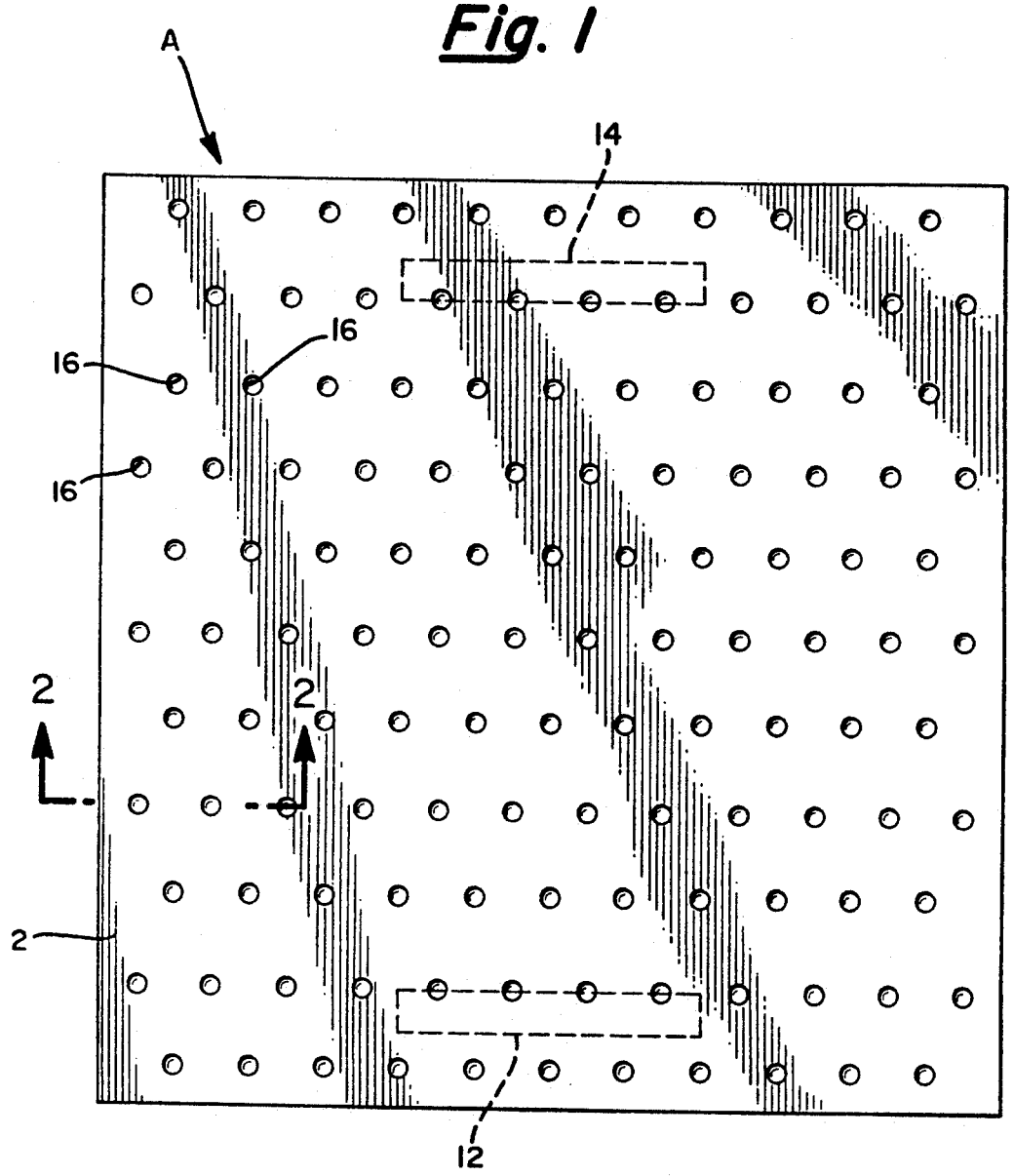
FIG. 1 is a top plan view of a first embodiment of a concrete stamp member of the present invention having a pattern of concavities formed in the front surface thereof and handles shown in phantom.

Concrete surfaces having visual and tactile warning means discernable by pedestrian traffic as well as users of wheeled conveyances are formed by initially preparing a concrete mixture. The concrete mixture may be of any composition commonly used throughout the industry for forming ramps, roadways, sidewalks and the like structures. The concrete mixture may be uncolored or it may contain coloring additives standard within the trade.

The prepared concrete mixture is poured into a concrete receiving form. Depending upon the type of structure being produced, the form may be of the type conventionally used in preparing ramps, sidewalks, roadways and the like.

The surface of the poured concrete is leveled or otherwise manipulated preferably through the use of a bull float or similar tool. The concrete is then allowed to stand for a period of time generally ranging from about ½ to 1 hour, or until the cement has partially set and has assumed a plastic state. The partially set plastic state may be detected by performing what is referred to in the trade as a thumb test. A thumb test is performed by pressing one's thumb into the standing concrete surface and then subsequently removing it from the concrete. When the concrete has achieved a partially set plastic state suitable for stamping, no concrete will adhere to the thumb upon its removal from the concrete surface. The presence of concrete on the thumb upon its removal from the concrete indicates that the concrete has not yet achieved a partially set plastic state and is therefore unsuitable for stamping.

Upon achieving a partially set plastic state, the concrete is coated with a release agent. The release agent should substantially cover the surface of the concrete. The release agent should be of a color different from the color of the concrete. If the concrete does not contain any coloring agents, then the release agent may be of any color distinguishable from the normal color of the concrete. If the concrete is provided with coloring agents, the release agent should be of a color distinguishable from the color produced by the addition of the coloring agents to the concrete. The release agent is preferably in a powder form, although other forms are anticipated by the present invention. The release agent may be selected from any of the release agents commonly used in the trade.

A stamp member is then selected for use. The stamp member includes a generally planar front surface provided with a pattern of indentations formed therein and a back surface from which integral handles project. The stamp member preferably includes a main body portion comprised of three distinct layers with handle members in the form of loop straps partially embedded within the main body portion and projecting from the back surface. A more complete description covering the construction of the stamp member, particularly with respect to the layered main body portion and embedded handles may be obtained through a review of U.S. Pat. No. 5,061,172 issued Oct. 29, 1991 to Fennessy, which is incorporated herein by reference.

The individual indentations forming the pattern of indentation are preferably of identical shape, although it is contemplated that more than one shape may be combined for any given pattern. The preferred indentation shapes are concavities, truncated concavities and truncated cone-shaped indentations.

A preferred pattern for the indentations is one in which the indentations are arranged in spaced apart rows with the indentations of adjacent rows being offset from one another, the indentations of even numbered rows being in columnar alignment with each other and the indentations of odd numbered rows likewise being in columnar alignment with each other. Such a pattern of indentations is shown in FIG. 1 of the drawings. The center-to-center distance between any adjacent pair of indentations is preferably at least 2.35 inches. In addition, the indentations are preferably at least 0.2 inches deep and at least 0.9 inches in diameter.

Once the stamp member to be used is selected, additional colored release agent is applied to the generally planar stamp surface including the indentations formed therein. The handles on the back surface of the stamp member are then grasped and the stamp member is positioned on top of the concrete so that the colored release agent on the generally planar stamp surface is in contact with the colored release agent covering the concrete surface.

Next, pressure is applied to the back surface of the stamp member, for example, by standing thereon, forcing concrete to flow into and to fill the indentations and to simultaneously cause intimate mixing of the colored release agent with the concrete flowing into and filling the indentations.

After pressure has been applied to the stamp member to cause the indentations to be filled with an intimate mixture of concrete and colored release agent, the stamp member may be immediately removed from the concrete to yield a generally planar concrete surface superficially covered with colored release agent interrupted by a pattern of projections extending from the generally planar surface. The projections are in a pattern and are of s shape corresponding to the pattern and shape of the indentations formed in the stamp member. In addition, the projections are formed from an intimate mixture of concrete and colored release agent.

The concrete is then allowed to set until hardened, generally for a period of from about 12 to about 24 hours. Once the concrete has properly set, its entire surface is rinsed off, preferably by hosing with water. The rinsing step removes the superficial colored release agent from the generally planar concrete surface and leaves the projections colored with the release agent. The release agent-colored projections thus visually contrast with the generally planar concrete surface from which the color release agent has been removed.

After rinsing, the concrete may be dried and a sealer applied to its surface to protect it from traffic as well as the elements. The sealer is preferably a clear coat sealer and it may be applied to the concrete by spraying, rolling or brushing.

Various embodiments of the stamp member used in accordance with the method of the present invention are shown in FIGS. 1 through 4 of the drawings, in which like numbers are used to depict like elements in the various FIGURES.

Figure 2:
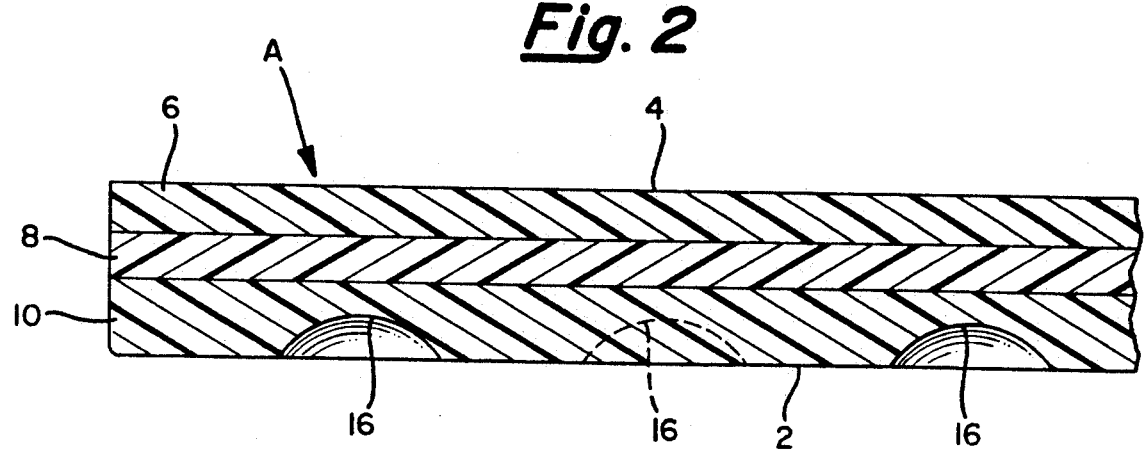
FIG. 2 is a fragmentary cross-sectional view along lines 2—2 of FIG. 1 and viewed in the direction of the arrows.

A first embodiment of the stamp member is shown in FIGS. 1 and 2 wherein a stamp member A includes a generally planar front surface 2 and a rear surface 4. Stamp member A is comprised of layers 6, 8 and 10. Each of the layers 6, 8 and 10 is formed from a flexible elastomeric material having memory. The preferred flexible elastomeric material is polyurethane. Stamp member A is provided with a pair of loop handles 12 and 14 as shown in phantom lines in FIG. 1. The loop handles are partially embedded between the layers of the stamp member and extend outwardly from rear surface 4.

A detailed description of the handles as well as the layers forming the stamp member may be found in U.S.

Pat. No. 5,061,172, which is incorporated herein by reference.

Generally planar front surface 2 is interrupted by a pattern of indentations in the form of concavities 16. Concavities 16 are arranged in spaced apart rows, the concavities of adjacent rows being offset from one another, the concavities of even numbered rows being in columnar alignment with each other and the concavities of odd numbered rows being in columnar alignment with each other. The stamp member of FIG. 1 and 2 would be used to produce a generally planar concrete surface having a pattern of dome-shaped projections.

Figure 3:
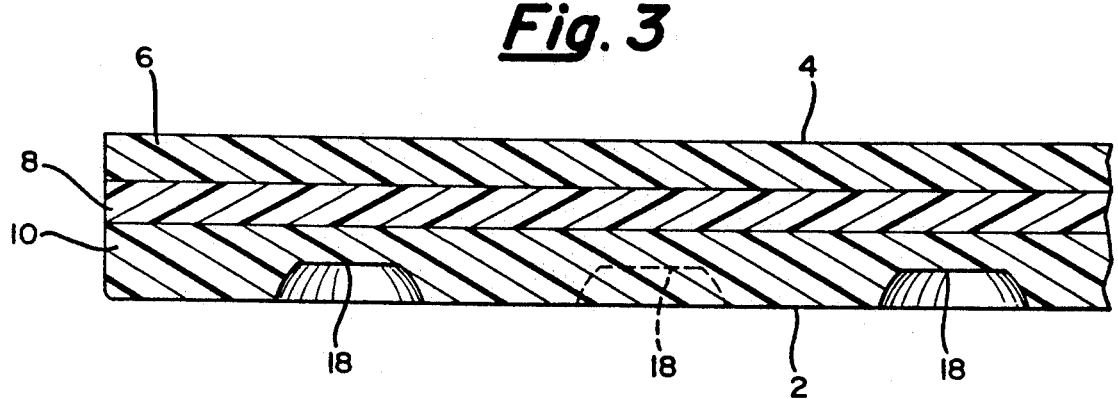
FIG. 3 is a fragmentary cross-sectional view of a second embodiment of a stamp member according to the present invention.

FIG. 3 shows a fragmentary view of second embodiment of a stamp number, similar to the stamp members of FIGS. 1 and 2, however, having a pattern of indentations in the form of truncated concavities 18 (one truncated concavity 18 shown) formed in generally planar front surface 2. The stamp member of FIG. 3 would be used to produce a generally planar concrete surface having a pattern of truncated dome-shaped projections extending therefrom.

Figure 4:
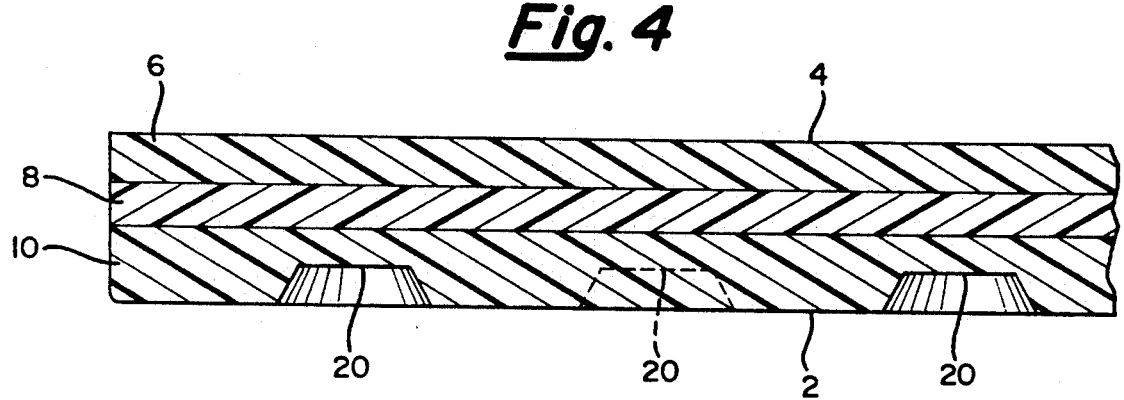
FIG. 4 is a fragmentary cross-sectional view of a third embodiment of a stamp member according to the present invention.

FIG. 4 shows a fragmentary view of a third embodiment of a stamp member, similar to the stamp member of FIGS. 1 and 2, however, having a pattern of truncated cone-shaped indentations 20 (one truncated cone-shaped indentation shown) formed in generally planar front surface 2. This stamp member would be used to produce a generally planar concrete surface having a pattern of truncated cone-shaped projections extending therefrom.

Figure 5:
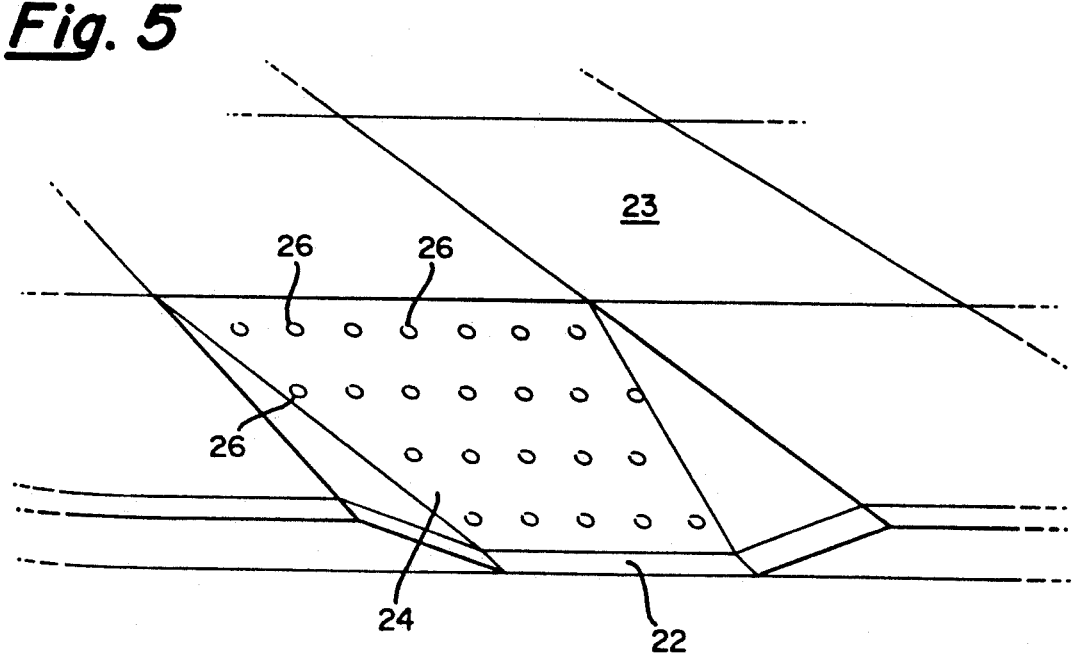
FIG. 5 is a fragmentary perspective of a concrete ramp with integral warning projections as produced using the stamp member of FIGS. 1 and 2.

FIG. 5 shows a concrete curb ramp 22 produced according to the method of the present invention. Concrete curb ramp 22, formed in concrete sidewalk 23, includes a generally planar surface 24 having a pattern of generally dome-shaped projection 26 extending therefrom. The generally dome-shaped projections would be produced according to the method of the present invention to have a color visually contrasting with the color of the generally planar surface 24.

While a generally square-shaped stamp member having a particular pattern of indentations is illustrated in the drawings, it should be understood that stamp members having other shapes and patterns are capable of being used either alone or in combination with each other to produce concrete structures according to the present invention.

While this invention has been described in connection with different embodiments thereof, it will be understood that it is capable of further modifications, and this application is intended to cover any variations, uses, or adaptations of the invention following, in general, the principle of the invention and including such departures from the present disclosure as come within known or customary practice in the art to which the invention pertains, and as may be applied to the essential features herein before set forth and followed in the scope of the invention or the limits of the appended claims.

I claim:

1. A method for forming a concrete surface having visual and tactile warning means for pedestrian traffic and users of wheeled conveyances, including the steps of:
   a) preparing a concrete mixture suitable for pouring into a concrete receiving form;
   b) pouring the concrete mixture into a concrete receiving form;
   c) floating the surface of the poured concrete;
   d) allowing the poured concrete to stand until assuming a partially set plastic state;
   e) substantially covering the surface of the concrete with a release agent of a color different from the color of the concrete;
   f) providing a stamp member having a generally planar stamp surface and a pattern of indentations formed in the generally planar stamp surface;
   g) applying additional colored release agent onto the stamp member substantially covering the generally planar stamp surface and the indentations formed therein;
   h) positioning the stamp member onto the concrete surface with the release agent on the generally planar stamp surface contacting the release agent on the concrete surface;
   i) applying pressure to the stamp member forcing concrete to flow into and to fill the indentations and to simultaneously cause intimate mixing of the colored release agent with the concrete flowing into the indentations;
   j) removing the stamp member yielding a generally planar concrete surface superficially covered with colored release agent and a pattern of shaped projections extending from the generally planar surface, the projections being in a pattern and of a shape corresponding to the pattern and shape of the indentations in the stamp member and the projections comprising an intimate mixture of concrete and colored release agent;
   k) setting the concrete until hardened; and
   l) rinsing the entire concrete surface whereby the superficial colored release agent is removed from the generally planar surface leaving the projections colored with the release agent and contrasting with the generally planar surface from which the release agent has been removed.

2. A method for forming a concrete surface as in claim 1, including the additional steps of:
   a) drying the rinsed concrete; and
   b) applying a sealing agent to the dried concrete.

3. A method for forming a concrete surface as in claim 2, including the step of:
   a) applying a sealing agent to the dried concrete by rolling.

4. A method for forming a concrete surface as in claim 2, including the step of:
   a) applying a sealing agent to the dried concrete by brushing.

5. A method for forming a concrete surface as in claim 2, including the step of:
   a) applying a sealing agent to the dried concrete by spraying.

6. A method for forming a concrete surface as in claim 2, including the step of:
   a) applying a clear coat sealing agent to the dried concrete.

7. A method for forming a concrete surface as in claim 1, including the step of:
   a) preparing a concrete mixture colored with a coloring agent of a colored different from the color of the release agent.

8. A method for forming a concrete surface as in claim 1, including the step of:
   a) floating the surface of the poured concrete using a bull float.

9. A method for forming a concrete surface as in claim 1, including the step of:

a) allowing the poured concrete to stand for between ½ and 1 hour to assume said plastic state.

10. A method for forming a concrete surface as in claim 1, including the step of:
 a) allowing the poured concrete to stand until it has assumed a partially set plastic state as determined by a thumb test.

11. A method for forming a concrete surface as in claim 1, including the step of:
 a) substantially covering the surface of the concrete with a release agent having a powder form.

12. A method for forming a concrete surface as in claim 1, including the step of:
 a) providing a stamp member having a generally planar front stamp surface provided with a pattern of indentations formed therein and a back surface provided with integral handles.

13. A method for forming a concrete surface as in claim 12, including the step of:
 a) grasping the handles of the stamp member and manually positioning the stamp member onto the concrete surface.

14. A method for forming a concrete surface as in claim 13, including the step of:
 a) applying pressure to the stamp member by standing on the back surface of the stamp member.

15. A method for forming a concrete surface as in claim 14, including the step of:
 a) immediately removing the stamp member after applying pressure.

16. A method for forming a concrete surface as in claim 1, including the step of:
 a) setting the concrete from 12 to 24 hours to harden the same.

17. A method for forming a concrete surface as in claim 1, including the step of:
 a) rinsing the concrete by hosing with water.

18. A method for forming a concrete surface as in claim 1, including the step of:
 a) providing a stamp member having a generally planar stamp surface including spaced apart rows of indentations, the indentations adjacent rows being offset from one another, the indentations of even numbered rows being in columnar alignment and the indentations of odd numbered rows being in columnar alignment.

19. A method for forming a concrete surface as in claim 18, including the step of:
 a) providing a stamp member in which the center-to-center distance between any adjacent pair of indentations is at least about 2.35 inches.

20. A method for forming a concrete surface as in claim 1, including the step of:
 a) pouring the concrete into a ramp-forming concrete receiving form.

21. A method for forming a concrete surface as in claim 1, including the steps of:
 a) providing a stamp member having a generally planar stamp surface and a pattern of indentations in the form of concavities formed in the generally planar stamp surface; and
 b) subsequently removing the stamp member yielding a generally planar concrete surface superficially covered with colored release agent and a pattern of dome-shaped projections intimately mixed with colored release agent and extending from the generally planar concrete surface.

22. A method for forming a concrete surface as in claim 1, including the steps of:
 a) providing a stamp member having a generally planar stamp surface and a pattern of indentations in the form of truncated concavities formed in the generally planar stamp surface; and
 b) subsequently removing the stamp member yielding a generally planar concrete surface superficially covered with colored release agent and a pattern of truncated dome-shaped projection intimately mixed with colored release agent extending from the generally planar concrete surface.

23. A method for forming a concrete surface as in claim 1, including the steps of:
 a) providing a stamp member having a generally planar stamp surface and a pattern of truncated cone-shaped indentations formed in the generally planar surface; and
 b) subsequently removing the stamp member yielding a generally planar concrete surface superficially covered with colored release agent and a pattern of truncated cone-shaped projections intimately mixed with colored release agent extending from the generally planar concrete surface.

24. A method for forming a concrete surface as in claim 19, including the step of:
 a) providing a stamp member wherein the indentation have a depth of at least about 0.2 inches and a diameter of at least about 0.9 inches.

25. A concrete surface having visual and tactile warning means for pedestrian traffic and wheeled conveyances, produced by the method of claim 1.

26. A concrete surface having visual and tactile warning means for pedestrian traffic and wheeled conveyances, produced by the method of claim 2.

27. A concrete surface having visual and tactile warning means for pedestrian traffic and wheeled conveyances, produced by the method of claim 18.

28. A concrete surface having visual and tactile warning means for pedestrian traffic and wheeled conveyances, produced by the method of claim 19.

29. A concrete surface having visual and tactile warning means for pedestrian traffic and wheeled conveyances, produced by the method of claim 20.

30. A concrete surface having visual and tactile warning means for pedestrian traffic and wheeled conveyances, produced by the method of claim 21.

31. A concrete surface having visual and tactile warning means for pedestrian traffic and wheeled conveyances, produced by the method of claim 22.

32. A concrete surface having visual and tactile warning means for pedestrian traffic and wheeled conveyances, produced by the method of claim 23.

33. A concrete surface having visual and tactile warning means for pedestrian traffic and wheeled conveyances, produced by the method of claim 24.

* * * * *